(12) United States Patent
Lin et al.

(10) Patent No.: US 11,872,704 B2
(45) Date of Patent: Jan. 16, 2024

(54) DYNAMIC MOTION PLANNING SYSTEM

(71) Applicant: FANUC CORPORATION, Yamanashi (JP)

(72) Inventors: Hsien-Chung Lin, Fremont, CA (US); Chiara Talignani Landi, Reggio Emilia (IT); Chi-Keng Tsai, Bloomfield Hills, MI (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 179 days.

(21) Appl. No.: 17/455,676

(22) Filed: Nov. 19, 2021

(65) Prior Publication Data

US 2023/0158670 A1    May 25, 2023

(51) Int. Cl.
*B25J 13/08*    (2006.01)
*B25J 9/16*    (2006.01)

(52) U.S. Cl.
CPC ........... *B25J 9/1666* (2013.01); *B25J 9/1651* (2013.01); *B25J 9/1653* (2013.01); *B25J 9/1676* (2013.01); *B25J 9/1697* (2013.01); *B25J 13/089* (2013.01)

(58) Field of Classification Search
CPC ...... B25J 9/1666; B25J 9/1651; B25J 9/1653; B25J 9/1676; B25J 9/1697; B25J 13/089
See application file for complete search history.

(56) References Cited

U.S. PATENT DOCUMENTS

| 11,254,003 | B1* | 2/2022 | Zhao | G05D 1/0217 |
| 2016/0016311 | A1* | 1/2016 | Konolige | B25J 9/1664 |
| | | | | 901/30 |
| 2016/0023352 | A1* | 1/2016 | Kennedy | B25J 9/0087 |
| | | | | 901/30 |
| 2020/0338733 | A1* | 10/2020 | Dupuis | G05D 1/0291 |

(Continued)

OTHER PUBLICATIONS

Ferraguti, Federica, et al. "Safety barrier functions and multi-camera tracking for human-robot shared environment." Robotics and Autonomous Systems 124 (2020).

(Continued)

*Primary Examiner* — Adam R Mott
*Assistant Examiner* — Heather J Keniry
(74) *Attorney, Agent, or Firm* — John A. Miller; Shumaker, Loop & Kendrick, LLP (57) ABSTRACT

A method and system for dynamic collision avoidance motion planning for industrial robots. An obstacle avoidance motion optimization routine receives a planned path and obstacle detection data as inputs, and computes a commanded robot path which avoids any detected obstacles. Robot joint motions to follow the tool center point path are used by a robot controller to command robot motion. The planning and optimization calculations are performed in a feedback loop which is decoupled from the controller feedback loop which computes robot commands based on actual robot position. The two feedback loops perform planning, command and control calculations in real time, including responding to dynamic obstacles which may be present in the robot workspace. The optimization calculations include (Continued)

a safety function which efficiently incorporates both relative position and relative velocity of the obstacles with respect to the robot.

20 Claims, 6 Drawing Sheets

(56) References Cited

U.S. PATENT DOCUMENTS

2021/0260770 A1* 8/2021 Vu ........................... G01S 17/87
2022/0003569 A1* 1/2022 Maeda ................. G05D 1/0274

OTHER PUBLICATIONS

Ferraguti, Federica, et al. "A Control Barrier Function Approach for Maximizing Performance While Fulfilling to ISO/TS 15066 Regulations, " in IEEE Robotics and Automation Letters, vol. 5, No. 4, pp. 5921-5928, Oct. 2020.

* cited by examiner

DYNAMIC MOTION PLANNING SYSTEM

BACKGROUND

Field

The present disclosure relates generally to the field of industrial robot motion planning and, more particularly, to a method and system for robot motion planning in the presence of dynamic obstacles, where an obstacle avoidance motion optimization calculation is decoupled from the robot feedback motion controller, and where the motion optimization calculation includes an obstacle avoidance constraint which efficiently incorporates both relative position and relative velocity of the obstacle with respect to the robot.

Discussion of the Related Art

The use of industrial robots to perform a wide range of manufacturing, assembly and material movement operations is well known. In many robot workspace environments, obstacles are present and may be in the path of the robot's motion. The obstacles may be permanent structures such as machines and fixtures, which can easily be avoided by the robot due to their static nature. The obstacles may also be dynamic objects which move into or through the robot workspace at random. Dynamic objects must be accounted for in real-time calculations by the robot controller, where the robot must maneuver around the objects while performing an operation. Collisions between the robot and any obstacle must absolutely be avoided.

Prior art techniques for dynamic collision avoidance motion planning include a collision avoidance safety function calculation between the robot controller motion planner and the physical robot system. In this computational arrangement, both the robot's actual motion and the detection and avoidance of obstacles are contained in a single closed-loop feedback system. Although this arrangement makes sense logically, in practice the system exhibits feedback delays due to the highly coupled and often conflicting nature of the inputs and feedback loops.

In addition, existing dynamic motion planning systems use complex safety function formulations for collision avoidance. These systems exhibit a variety of shortcomings—including numerical instability issues, insensitivity to static obstacles, computational complexity leading to slowness in motion planning calculations, and inability to consider robot parts (i.e., robot arms) other than the end-of-arm tool in the robot-obstacle collision avoidance calculations.

In light of the circumstances described above, there is a need for an improved dynamic motion planning system for industrial robots which efficiently and effectively incorporates collision avoidance of both static and moving obstacles.

SUMMARY

In accordance with the teachings of the present disclosure, a method and system for dynamic collision avoidance motion planning for industrial robots are described and shown. An obstacle avoidance motion optimization routine receives a planned path and obstacle detection data as inputs, and computes a commanded robot path which avoids any detected obstacles. Robot joint motions to follow the tool center point path are used by a robot controller to command robot motion. The planning and optimization calculations are performed in a feedback loop which is decoupled from the controller feedback loop which computes robot commands based on actual robot position. The two feedback loops perform planning, command and control calculations in real time, including responding to dynamic obstacles which may be present in the robot workspace. The optimization calculations include a safety function which efficiently incorporates both relative position and relative velocity of the obstacles with respect to the robot.

Additional features of the presently disclosed systems and methods will become apparent from the following description and appended claims, taken in conjunction with the accompanying drawings.

DETAILED DESCRIPTION OF THE EMBODIMENTS

The following discussion of the embodiments of the disclosure directed to a dynamic motion planning system is merely exemplary in nature, and is in no way intended to limit the disclosed devices and techniques or their applications or uses.

It is well known to use industrial robots for a variety of manufacturing, assembly and material movement operations. In many robot workspace environments, obstacles may be present and may at times be in the path of the robot's motion. That is, without adaptive motion planning, some part of the robot may collide with or be near to some part of an obstacle when the robot moves from its current position to a destination position. The obstacles may be static structures such as machines, fixtures and tables, or the obstacles may be dynamic (moving) objects such as people, forklifts and other machines.

Techniques have been developed in the art for computing robot motions such that the tool follows a path to the destination position while avoiding collision of the robot with any obstacle. However, these systems exhibit a variety of shortcomings—including numerical instability issues, insensitivity to static obstacles, computational complexity leading to slowness in motion planning calculations, and inability to consider robot parts (i.e., robot arms) other than the end-of-arm tool in the robot-obstacle collision avoidance calculations.

Figure 1:
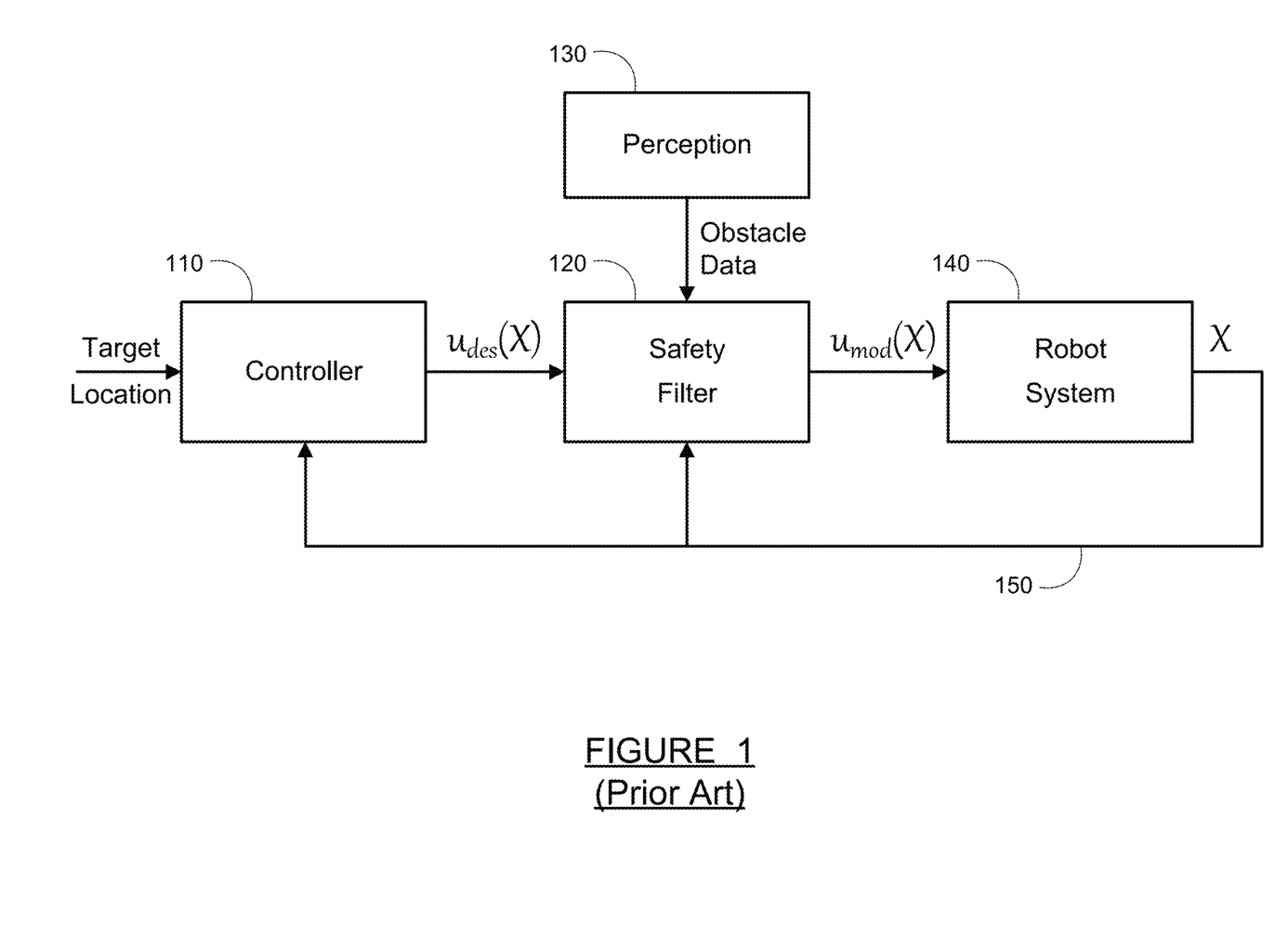
FIG. 1 is a block diagram illustration of a closed loop dynamic motion planning system, incorporating a collision avoidance safety filter between the robot controller motion computation and the physical robot, as known in the art.

FIG. 1 is a block diagram illustration of a closed loop dynamic motion planning system, incorporating a collision avoidance safety filter between the robot controller motion computation and the physical robot, as known in the art. A robot controller 110 computes robot motion commands based on an input target (destination) location, in a manner known in the art. The motion commands are designated as $u_{des}(X)$, where $u_{des}$ is a tool center point acceleration vector in Cartesian space defining "design" robot motions. Rather than providing the motion commands directly to the robot, the controller 110 provides the motion commands to a safety filter module 120.

The safety filter module 120 also receives obstacle data input from a perception module 130. The perception module 130 includes one or more cameras or sensors configured to provide data about obstacles which may exist in the robot workspace. The obstacle data typically includes a minimum robot-obstacle distance, and may also include other data about the position (including spatial shape) and velocity of any obstacles. Based on the obstacle data, the safety filter module 120 computes modified motion commands $u_{mod}$ and provides the modified motion commands to a robot system 140. If no obstacles exist in the robot workspace, the modified motion commands $u_{mod}$ will be the same as the design motion commands $u_{des}$.

The robot system 140 includes the robot, which responds to the modified motion commands $u_{mod}$ by physically moving. The actual robot state vector X represents the robot position and velocity at the current control cycle time step, either in Cartesian space or in joint space. The actual robot state vector X is provided on a feedback loop 150 to both the controller 110 and the safety filter module 120, where it is used in feedback control calculations of new values of the design motion commands $u_{des}$ and the modified motion commands $u_{mod}$, respectively, for the next control cycle time step.

The feedback control arrangement of the prior art system shown in FIG. 1 makes sense logically, as the controller 110 computes an ideal motion command and the safety filter 120 modifies the ideal motion if necessary based on obstacle data, and both of these computations include feedback of the actual robot system state. However, in practice the system exhibits feedback delays due to the highly coupled and often conflicting nature of the inputs and feedback loops. Additionally, existing dynamic motion planning systems of the type depicted in FIG. 1 often use complex safety function formulations in the safety filter module 120. These safety function formulations exacerbate the problem of slow motion planning computation, and lead to other problems as described earlier.

The dynamic motion planning system of the present disclosure overcomes the shortcomings of prior art systems by decoupling motion planning and obstacle avoidance calculations from the feedback control loop of the robot and its controller. The presently disclosed system also uses a simplified but effective safety function formulation which considers both the position and velocity of any obstacles relative to the robot when computing robot motion commands.

Figure 2:
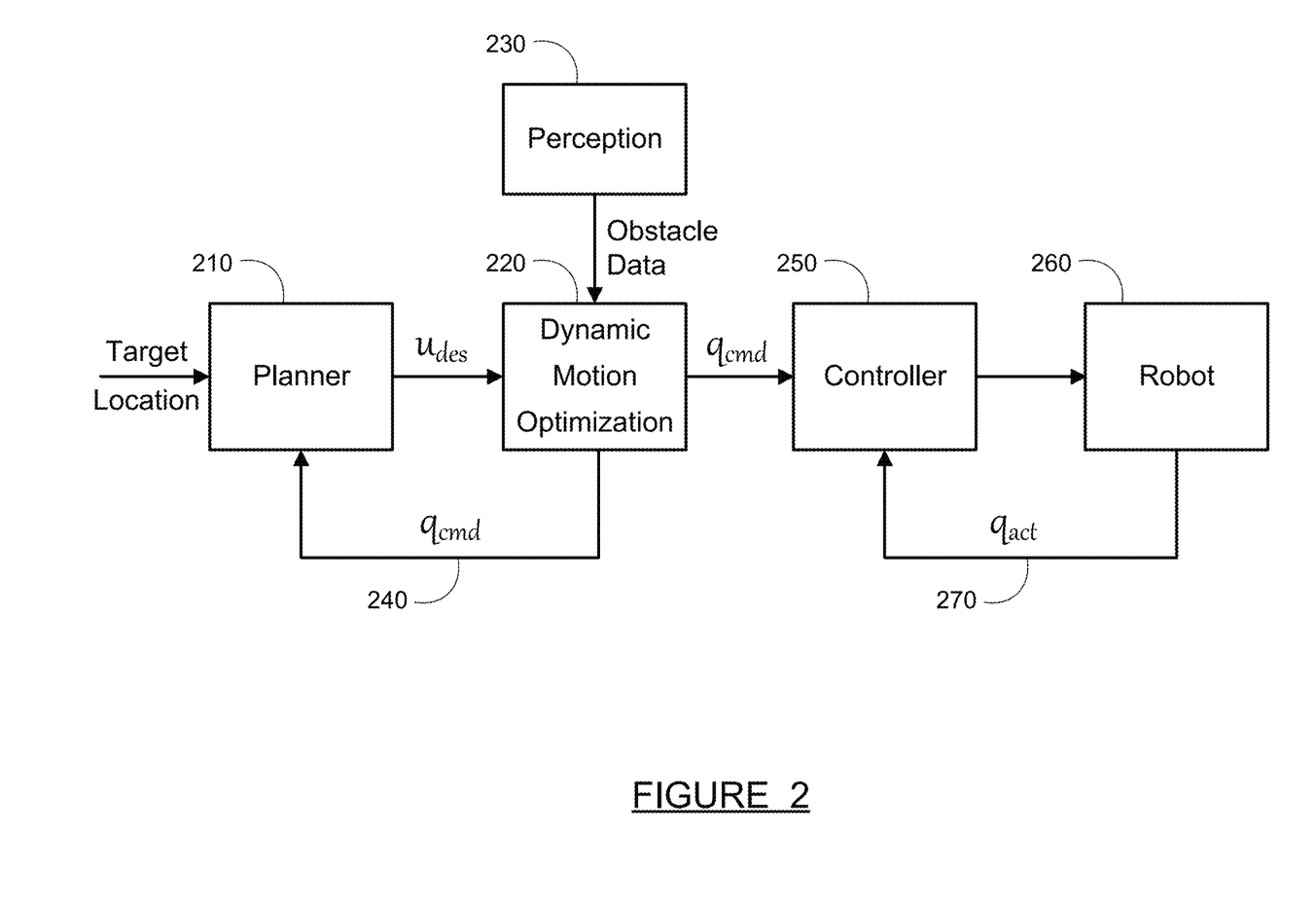
FIG. 2 is a block diagram illustration of a dynamic motion planning system including a collision avoidance motion planning loop decoupled from a robot feedback control loop, according to an embodiment of the present disclosure.

FIG. 2 is a block diagram illustration of a dynamic motion planning system including a collision avoidance motion planning loop decoupled from a robot feedback control loop, according to an embodiment of the present disclosure. A planner module 210 computes a planned robot motion based on an input target (destination) location. In one non-limiting example, the robot tool is a gripper, and the robot's task is to move a part from a source location to the target location. The planned robot motion $u_{des}$ is an acceleration vector defining "design" (planned) robot motion in Cartesian space. Specifically, $u_{des}$ may be defined as tool center point acceleration. The planner module 210 provides the planned robot motion $u_{des}$ to a dynamic motion optimization module 220.

The dynamic motion optimization module 220 also receives obstacle data input from a perception module 230. The perception module 230 includes one or more cameras or sensors configured to provide data about obstacles which may exist in the robot workspace. As discussed above relative to FIG. 1, the obstacle data typically includes at least a minimum robot-obstacle distance, and may also include other data about the position (including spatial shape) and velocity of any obstacles.

The dynamic motion optimization module 220 performs an optimization computation which minimizes tracking deviation from the planned robot motion $u_{des}$ while including robot mechanical limitations and a collision avoidance safety function as constraints. This optimization computation results in a commanded robot motion $q_{cmd}$. The commanded robot motion $q_{cmd}$ is the robot motion in joint space which will take the robot tool to the target location while avoiding any obstacles in the robot workspace. The optimization computation is discussed in detail below. A feedback loop 240 provides the commanded robot motion $q_{cmd}$ from the dynamic motion optimization module 220 back to the planner module 210. The planner module 210 and the dynamic motion optimization module 220 repeat the calculations described above at each control cycle.

The dynamic motion optimization module 220 also provides the commanded robot motion $q_{cmd}$ to a robot controller 250. The robot controller 250 provides robot control commands to a robot 260, and receives actual robot joint positions $q_{act}$ on a feedback loop 270. The robot controller 250 updates the robot control commands at each control cycle based on the actual robot joint positions $q_{act}$ and the commanded robot motion $q_{cmd}$.

The dynamic motion planning system of FIG. 2 overcomes the feedback delays and computational performance problems of prior art systems by decoupling motion planning and obstacle avoidance calculations (the modules 210 and 220, and the feedback loop 240) from the feedback control loop 270 of the robot 260 and its controller 250.

The actual hardware implementation of the dynamic motion planning system of FIG. 2 may be done in either of two different fashions. In one implementation approach, the planner module 210 and the dynamic motion optimization module 220 are algorithms which run on a processor in the robot controller 250. That is, the physical robot controller device includes one or more processors which perform all of the computations of the modules 210, 220 and 250 of FIG. 2 in the manner described above. In another implementation approach, the planner module 210 and the dynamic motion optimization module 220 are algorithms which run on a processor in a separate computer (a different device) which communicates the commanded robot motion $q_{cmd}$ to the robot controller 250.

The dynamic motion optimization module 220 of the presently disclosed system also uses a simplified but effective safety function formulation which considers both the position and velocity of any obstacles relative to the robot when computing the commanded robot motion $q_{cmd}$. This safety function formulation and its use in the motion optimization computation are discussed below.

Figure 3A:
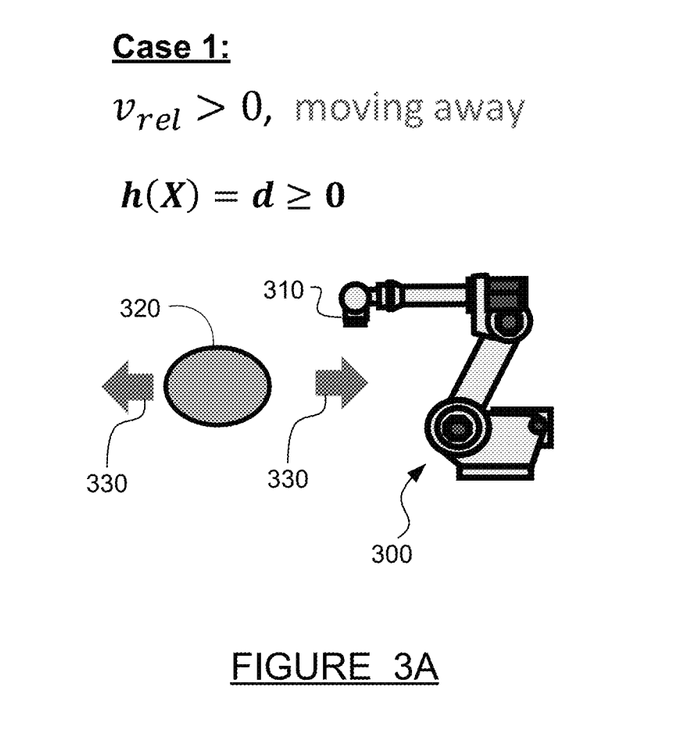
FIGS. 3A and 3B are illustrations of two different robot-obstacle motion scenarios and the resulting safety function formulation for each, according to an embodiment of the present disclosure.
Figure 3B:
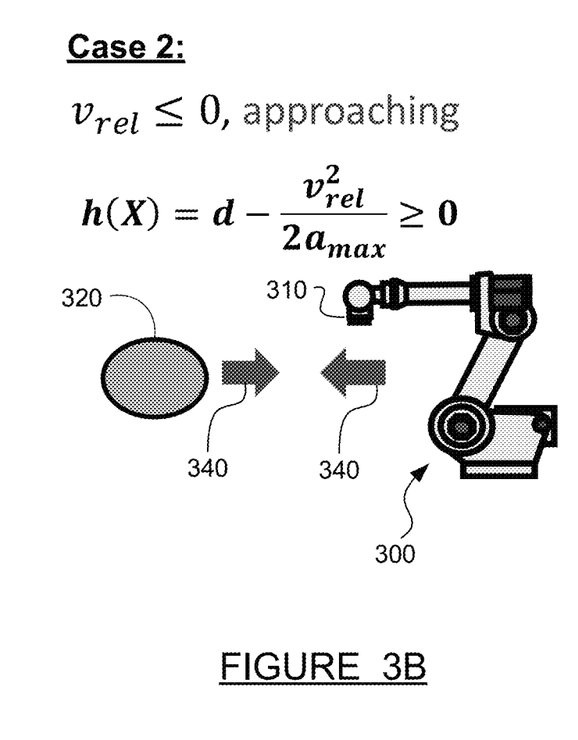

FIGS. 3A and 3B are illustrations of two different robot-obstacle motion scenarios and the resulting safety function formulation for each, used in the dynamic motion optimization module 220, according to an embodiment of the present disclosure. In FIGS. 3A and 3B, a robot 300 having an end-of-arm tool 310 operates in a workspace. An obstacle 320 is also present in the workspace.

In FIG. 3A, the obstacle 320 is moving away from the robot 300, such that the relative velocity of the obstacle 320 with respect to the robot 300 (that is, the rate of change of the minimum distance) is greater than zero ($v_{rel}>0$). The positive relative velocity could be due to the obstacle 320 moving away from the robot 300, or due to the end-of-arm tool 310 moving away from the obstacle 320, or it could be due to a combination of the two. When the relative velocity $v_{rel}$ is greater than zero as in FIG. 3A, a safety function is defined as $h(X)=d$, where $h(X)$ is the safety function which is used in an inequality constraint in the optimization computation, and d is the distance from the robot 300 to the obstacle 320 (typically the minimum distance, determined by the perception module 230 of FIG. 2).

In FIG. 3B, the obstacle 320 is moving toward (approaching) the robot 300, such that the relative velocity of the obstacle 320 with respect to the robot 300 is less than or equal to zero ($v_{rel} \leq 0$). The negative relative velocity could be due to the obstacle 320 moving toward the robot 300, or due to the end-of-arm tool 310 moving toward the obstacle 320, or due to a combination of the two. When the relative velocity $v_{rel}$ is less than or equal to zero as in FIG. 3B, the safety function is modified to include the relative velocity and is now defined as $$h(X) = d - \frac{v_{rel}^2}{2a_{max}},$$

where $h(X)$ is the safety function (used in an inequality constraint in the optimization computation), d is the distance from the robot 300 to the obstacle 320, $v_{rel}$ is the relative velocity, and $a_{max}$ is the maximum allowable acceleration of the robot based on mechanical limitations.

The safety function formulation depicted in FIGS. 3A and 3B and described above is both simple and effective by virtue of taking relative velocity into account—being less restrictive of robot motion when the obstacle is moving away from the robot, and using a simple calculation to compensate for approach velocity when the obstacle is moving toward the robot. The safety function is used in an inequality constraint (i.e., $h(X) \geq 0$) in the motion optimization computation performed in the dynamic motion optimization module 220 of FIG. 2. Details of the motion optimization computation are discussed further below.

Figure 4:
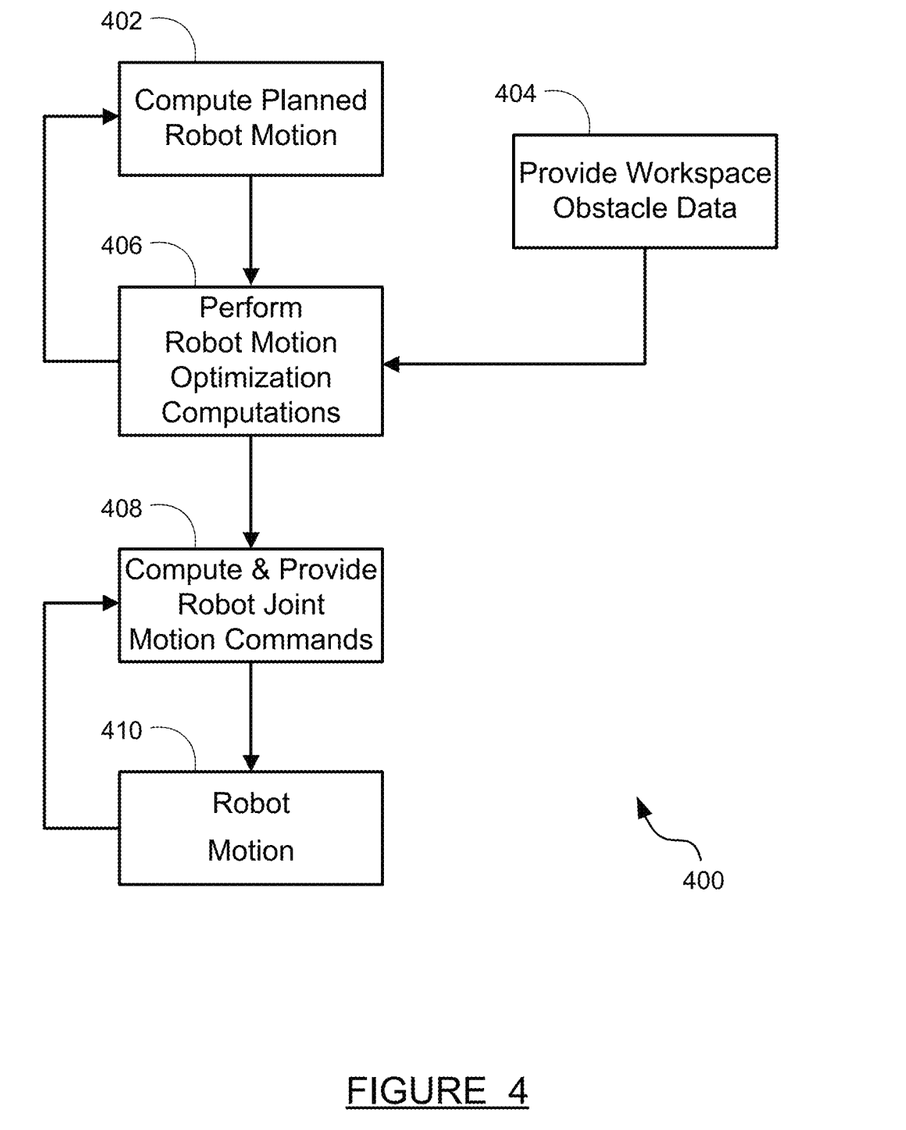
FIG. 4 is a flowchart diagram of a method for dynamic robot motion planning, according to an embodiment of the present disclosure.

FIG. 4 is a flowchart diagram 400 of a method for dynamic robot motion planning, according to an embodiment of the present disclosure. At box 402, a planned robot motion is computed based on a target or destination tool center point location. In a representative embodiment, the planned robot motion is a tool center point acceleration vector in Cartesian space defining "design" (planned) robot motions $u_{des}$ which move the tool center point to the target location. At box 404, workspace obstacle data is provided by a perception module. The perception module includes at least one camera or sensor, such as a three dimensional (3D) camera, which can detect the location of any obstacles which are present in the workspace. The perception module may include an image processor which computes obstacle location data from the camera images, or the perception module may simply provide raw camera images to a computer or controller which performs robot motion optimization computations. The obstacle location data is preferably computed in a workspace coordinate frame where it can be readily compared to robot position data. Minimum robot-obstacle distance and robot-obstacle relative velocity are ultimately required from the obstacle data.

At box 406, robot motion optimization computations are performed based on the planned robot motion and the obstacle data. The output of the robot motion optimization computations is the commanded robot motion $q_{cmd}$ discussed above with respect to FIG. 2. If no obstacles are present in the workspace, then the commanded robot motion is the same as the planned robot motion. The commanded robot motion is provided in a feedback loop to the box 402, where the planned robot motion is recomputed based on the target tool center point location and the commanded robot motion (which has been modified during optimization to avoid any obstacles).

At box 408, a robot controller provides the commanded robot motion to a robot. The robot controller may perform computations or transformations in order to provide suitable robot joint motion commands to the robot. At box 410, the robot actually moves based on the joint motion commands from the controller. The robot and controller operate as a closed loop feedback control system, where the actual robot state $q_{act}$ (joint positions and velocities) is fed back to the controller for computation of updated joint commands. The robot and controller operate on a control cycle having a designated time period (i.e., a certain number of milliseconds).

In the box 406, the motion optimization problem can be formulated as:

$$\arg\min \|u_{des} - \dot{J}\dot{q} - J\ddot{q}\| \qquad (1)$$

Such that;

$$\|\dot{q}\| \leq \dot{q}_{max} \qquad (2)$$

$$\|\ddot{q}\| \leq \ddot{q}_{max} \qquad (3)$$

$$\dot{h}(X) \geq -\gamma h(X) \qquad (4)$$

where Equation (1) is the optimization objective function (tracking deviation from the planned motion $u_{des}$) to be minimized, and Equations (2)-(4) are inequality constraints which must be met during the iterative optimization computation. In Equations (1)-(3), $\dot{q}$ and $\ddot{q}$ are the joint velocities and accelerations, respectively, for all joints in the robot, J is the Jacobian (a derivative of robot configuration) and $\dot{J}$ is the derivative of the Jacobian, and $\dot{q}_{max}$ and $\ddot{q}_{max}$ are predefined maximum joint velocities and accelerations based on robot mechanical limitations. An additional inequality constraint may be added (not shown above) which requires that the joint positions q remain within predefined joint position ranges.

For the obstacle avoidance constraint, the goal is to keep the safety function $h(X) \geq 0$, as shown in FIGS. 3A and 3B and discussed above. This is implemented by defining Equation (4) as $\dot{h}(X) \geq -\gamma h(X)$. For the simple case (Case 1 of FIG. 3A, moving away) where $h(X)=d$, Equation (4) simplifies to $\dot{d} \geq -\gamma d$, where $\gamma$ is a fixed coefficient, d is the minimum robot-obstacle distance and $\dot{d}$ is the rate of change of the minimum robot-obstacle distance. For Case 2 (approaching), the behavior is similar, but further compensated for approach velocity. In other words, Equation (4) dictates that the larger the minimum distance d, the larger the allowable rate of change of distance ($\dot{d}$). The value of the coefficient $\gamma$ can be established to achieve the desired system behavior, where a smaller value of $\gamma$ results in more conservative robot behavior (increased maneuvering to provide greater obstacle avoidance distances).

Upon convergence, the optimization computations yield the commanded robot motion $\ddot{q}_{cmd}$ which represents the robot motion having the minimum tracking deviation while satisfying the inequality constraints. If an obstacle approaches the robot extremely rapidly, the optimization computations of Equations (1)-(4) become infeasible; in this case, the system will slow down the motion of the robot and, if the optimization computation remains infeasible, stop the robot.

In FIG. 4, the computation of the planned robot motion at the box 402, the robot motion optimization computations at the box 406 and the computation of robot joint motion commands at the box 408 may all be performed on a robot controller which is in real-time communication with the robot. Alternately, the computations of the boxes 402 and 406 may be performed on a separate computer and the commanded robot motion for each control cycle provided to the controller at the box 408.

The dynamic motion planning techniques of FIGS. 2-4 have been demonstrated to produce reliable obstacle avoidance results in real robot systems. This includes both effective path planning to avoid any obstacles in the workspace, and rapid computation of the safety function and the resulting motion optimization.

Figure 5:
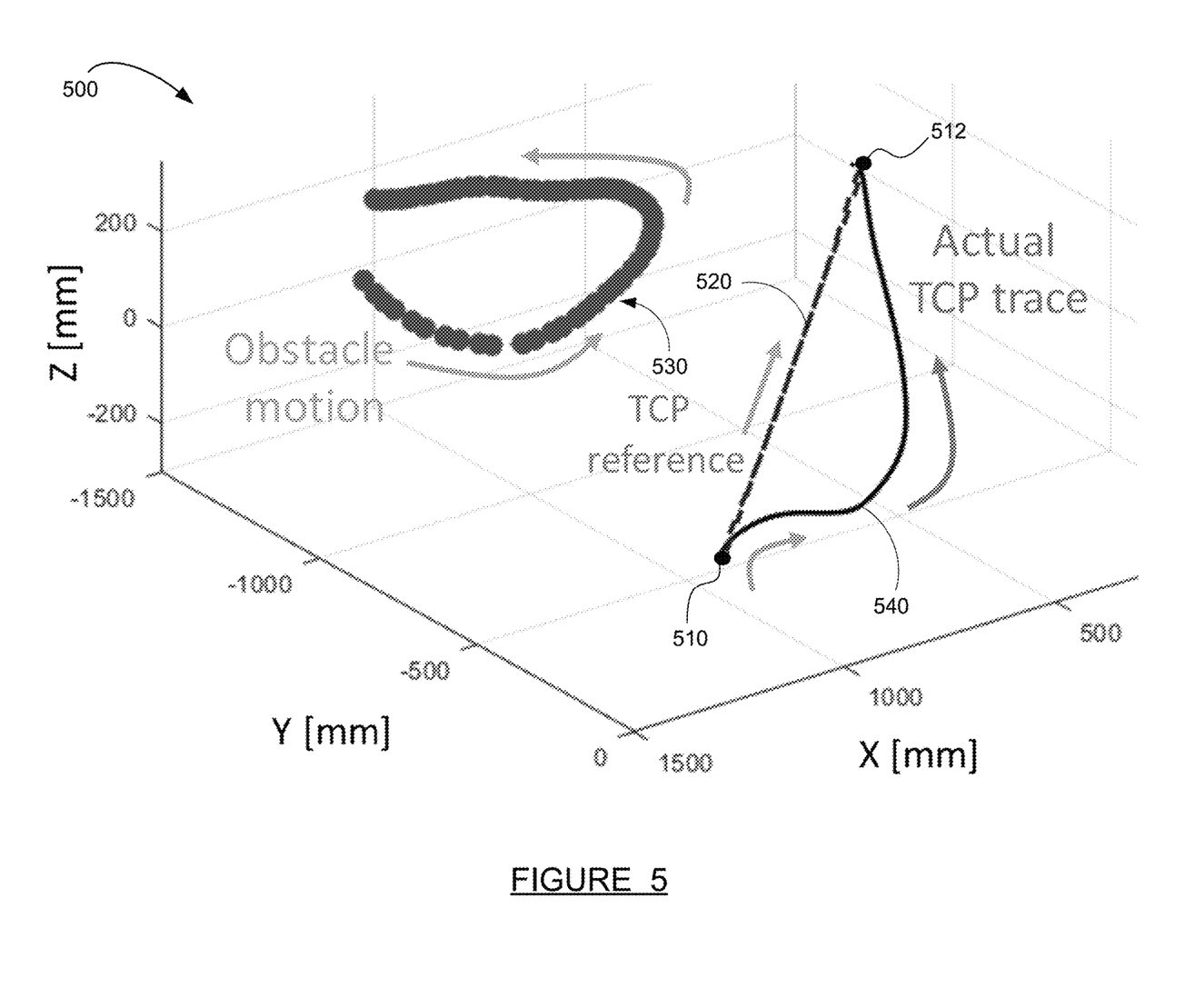
FIG. 5 is a graph of a robot tool center point path in three-dimensional space, both in absence of an obstacle in the robot workspace and with an obstacle moving through the workspace, according to an embodiment of the present disclosure.

FIG. 5 is a graph of a robot tool center point path in three-dimensional space, both in absence of an obstacle in the robot workspace and with an obstacle moving through the workspace, according to an embodiment of the present disclosure. A workspace 500 is represented in 3D space by orthogonal X, Y and Z axes as shown. A robot (not shown) operates in the workspace 500 and is required to perform a task which involves moving a tool center point from a start point 510 to a target (destination) point 512. FIG. 5 represents data collected from a real laboratory test.

Two different scenarios are depicted in FIG. 5. In a first scenario, no obstacles are present in the workspace 500. In the absence of any obstacles, the robot will move the tool center point directly from the start point 510 to the target point 512 in a straight line, along a reference path 520.

In a second scenario, an obstacle moves through the workspace 500, tracing a series of points along an obstacle path 530. In the real laboratory test, the obstacle was a small object held in a person's hand, where the person stepped toward and extended her arm toward the robot, causing the object to trace the obstacle path 530. The obstacle moves along the obstacle path 530 during the time that the robot tool is to be moved from the start point 510 to the target point 512. Using the dynamic path planning techniques of the present disclosure, the robot moves the tool center point from the start point 510 to the target point 512 along an obstacle avoidance path 540. The obstacle avoidance path 540 deviates significantly from the reference path 520 in order to provide safe clearance from the obstacle moving along the obstacle path 530. It is noteworthy that the most pronounced movement of the obstacle avoidance path 540 away from the reference path 520 is at the beginning of the path 540. This is because, at that time, the obstacle is moving toward the robot tool, causing the safety function h(X) to be reduced to compensate for the approach velocity, as discussed with respect to FIG. 3B.

Figure 6:
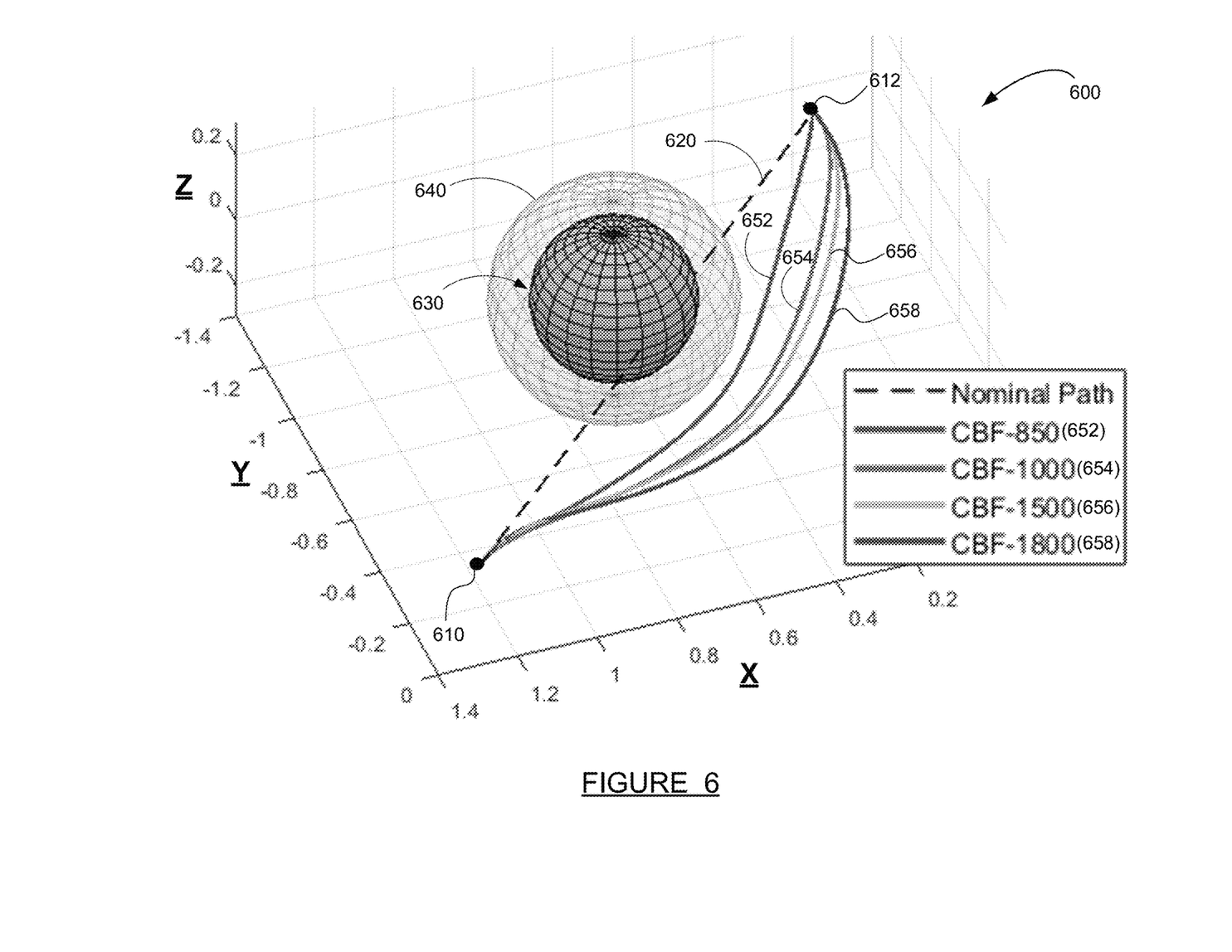
FIG. 6 is a graph of multiple robot tool center point paths in three-dimensional space, where each path represents a different robot speed and the robot is configured to avoid a static obstacle in the workspace, according to an embodiment of the present disclosure.

FIG. 6 is a graph of multiple robot tool center point paths in three-dimensional space, where each path represents a different robot speed and the robot is configured to avoid a static obstacle in the workspace, according to an embodiment of the present disclosure. A workspace 600 is represented in 3D space by orthogonal X, Y and Z axes as shown. A robot (not shown) operates in the workspace 600 and is required to perform a task which involves moving a tool center point from a start point 610 to a target (destination) point 612. FIG. 6 represents data collected from simulations of a particular robot and controller, using the dynamic path planning techniques of the present disclosure.

Multiple scenarios are depicted in FIG. 6. In a first scenario, no obstacles are present in the workspace 600. In the absence of any obstacles, the robot will move the tool center point directly from the start point 610 to the target point 612 in a straight line, along a nominal path 620.

In other scenarios, a fixed spherical obstacle 630 was placed in the workspace 600 in a location obstructing the nominal path 620. A buffer zone 640 defines a safe distance margin around the obstacle 630, where the robot and the tool center point should remain outside of the buffer zone 640. Four different simulations were run with the obstacle 630, using the same start point 610 and target point 612, where the robot's programmed maximum tool center point velocity was varied from a slowest maximum speed of 850 mm/sec to a fastest maximum speed of 1800 mm/sec. The dynamic path planning techniques of the present disclosure were used to compute the obstacle avoidance paths shown in FIG. 6.

For the slowest robot tool center point speed of 850 mm/sec, the robot moves the tool center point from the start point 610 to the target point 612 along an obstacle avoidance path 652. It can be observed that the obstacle avoidance path 652 deviates only enough from the nominal path 620 to cause the tool center point to remain slightly outside the buffer zone 640. For the somewhat faster robot tool center point speed of 1000 mm/sec, the robot moves the tool center point from the start point 610 to the target point 612 along an obstacle avoidance path 654. The obstacle avoidance path 654 deviates more from the nominal path 620 (than the path 652 does) to cause the tool center point to remain further outside the buffer zone 640. This is the expected behavior, because of the relative velocity subtractive term in the safety function h(X) (shown in FIG. 3B). A higher tool center point speed causes a greater relative velocity $v_{rel}$ between the tool and the obstacle 630, which reduces the value of the safety function h(X); this in turn dictates a larger value of the minimum distance d in order to keep the safety function h(X)≥0 during the optimization computation.

For the still faster robot tool center point speed of 1500 mm/sec, the robot moves the tool center point from the start point 610 to the target point 612 along an obstacle avoidance path 656. The obstacle avoidance path 656 deviates even more from the nominal path 620 (than the path 654 does) to cause the tool center point to remain even further outside the buffer zone 640. Finally, the fastest robot tool center point speed of 1800 mm/sec results in an obstacle avoidance path 658, which deviates furthest from the nominal path 620.

Using the dynamic path planning techniques of the present disclosure, the obstacle avoidance path deviates most from the nominal path 620 for the fastest tool speed (the path 658), and deviates least for the slowest tool speed (the path 652). These simulations confirm the behavior that is expected from the safety function and motion optimization computations described above.

In addition, the commanded motion computation time for each control cycle (the time to provide an output from the dynamic motion optimization module 220) was measured to have an average of 0.38 milliseconds (ms) for the disclosed techniques depicted in FIGS. 2-4. This compares to an average of about 40 ms computation time for the prior art technique of FIG. 1. Using a typical robot control cycle of 24 ms, the techniques of the present disclosure perform motion computations more than fast enough, while the prior art motion computations are untenably slow.

Throughout the preceding discussion, various computers and controllers are described and implied. It is to be understood that the software applications and modules of these computer and controllers are executed on one or more computing devices having a processor and a memory module. In particular, this includes a processor in each of the robot controller 250 and the optional separate computer (if used) of FIG. 2 discussed above. Specifically, the processor in the controller 250 and/or the separate computer (if used) are configured to perform the motion planning and obstacle avoidance motion optimization functions of the boxes 210 and 220, along with the robot feedback motion control function of the box 250.

As outlined above, the disclosed techniques for dynamic motion planning to avoid obstacles in a robot workspace provide significant advantages over prior art methods. The disclosed techniques decouple obstacle avoidance motion optimization from the robot-controller feedback loop, thereby avoiding the feedback delay problems of prior art systems. In addition, the disclosed safety function used in motion optimization computations compensates for robot-obstacle relative velocity in a way that is both effective and easily corn puted.

While a number of exemplary aspects and embodiments of the dynamic motion planning system have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A dynamic motion planning system for an industrial robot, said system comprising:
   a perception module including at least one sensor or camera configured to detect static and moving obstacles in a workspace of the robot and provide obstacle data including a position and a velocity of each of the obstacles;
   a planning module executing on a first computing device having a processor and memory, said planning module being configured to compute a design robot motion based on a target location of a tool center point on a tool attached to the robot;
   a motion optimization module executing on the first computing device and receiving the obstacle data from the perception module, said motion optimization module being configured to compute a commanded robot motion based on the design robot motion and the obstacle data, where the commanded robot motion is provided as feedback to the planning module; and
   a robot control module executing on the first computing device or a second computing device, said robot control module, at each robot control cycle, computing robot control commands for each robot joint based on the commanded robot motion, providing the robot control commands to the robot, and receiving actual robot state data as feedback from the robot,
   where, at each robot control cycle, the planning module computes a new design robot motion using the commanded robot motion provided as feedback, and the motion optimization module computes a new commanded robot motion using the new design robot motion and updated obstacle data from the perception module.

2. The system according to claim 1 wherein the first computing device is a robot controller which executes all of the planning module, the motion optimization module and the robot control module, and provides the robot control commands to the robot.

3. The system according to claim 1 wherein the first computing device executes the planning module and the motion optimization module, and the second computing device is a robot controller in communication with the first computing device, where the robot controller executes the robot control module and provides the robot control commands to the robot.

4. The system according to claim 1 wherein the commanded robot motion deviates from the design robot motion as necessary to provide a clearance space between the robot and any obstacles present in the obstacle data.

5. The system according to claim 1 wherein the motion optimization module computes the commanded robot motion using an iterative optimization computation having an objective function and one or more inequality constraints.

6. The system according to claim 5 wherein the objective function minimizes deviation from the design robot motion, and the inequality constraints include maintaining robot joint positions within predefined joint position ranges, maintaining robot joint velocities below predefined joint velocity limits and maintaining robot joint accelerations below predefined joint acceleration limits.

7. The system according to claim 5 wherein the inequality constraints include a safety constraint computed from a safety function, where the safety function is determined based on a robot-obstacle minimum distance and a robot-obstacle relative velocity.

8. The system according to claim 7 wherein the safety constraint is that the rate of change of the safety function must be greater than or equal to the negative of the safety function multiplied by a coefficient.

9. The system according to claim 7 wherein, when the robot-obstacle relative velocity is greater than zero, the safety function is equal to the robot-obstacle minimum distance, and when the robot-obstacle relative velocity is less than or equal to zero, the safety function is equal to the robot-obstacle minimum distance minus an additional safety margin distance which is a function of the robot-obstacle relative velocity.

10. The system according to claim 1 wherein the design robot motion is a tool center point acceleration in Cartesian space, and the commanded robot motion includes robot joint rotational accelerations for all joints in the robot.

11. A dynamic motion planning system for an industrial robot, said system executing on one or more computing devices and comprising:
    a planning module configured to compute a design robot motion based on a target location of a robot tool center point;
    a motion optimization module configured to compute a commanded robot motion based on the design robot motion and obstacle data received from sensors, the obstacle data including positions and velocities of static and moving obstacles, where the commanded robot motion is provided as feedback to the planning module; and
    a robot control module computing robot joint control commands based on the commanded robot motion, providing the robot joint control commands to the robot, and receiving actual robot joint state data as feedback from the robot, where, at each robot control cycle, the planning module computes a new design robot motion using the commanded robot motion provided as feedback, and the motion optimization module computes a new commanded robot motion using the new design robot motion and updated obstacle data from the sensors.

12. The system according to claim 11 wherein the motion optimization module computes the commanded robot motion using an iterative optimization computation having an objective function which minimizes deviation from the design robot motion and a safety constraint determined based on a robot-obstacle minimum distance and a robot-obstacle relative velocity, where the safety constraint is more relaxed when the robot-obstacle relative velocity is greater than zero than when the relative velocity is less than or equal to zero.

13. A method for dynamic motion planning for an industrial robot, said method executed on at least one computing device and comprising:

computing a design robot motion based on a target location of a robot tool center point;

computing a commanded robot motion based on the design robot motion and obstacle data received from sensors, the obstacle data including positions and velocities of static and moving obstacles, where the commanded robot motion is provided as feedback;

computing robot joint control commands based on the commanded robot motion;

providing the robot joint control commands to the robot; and receiving actual robot joint state data as feedback from the robot, where, at each robot control cycle, a new design robot motion is computed using the commanded robot motion provided as feedback, and a new commanded robot motion is computed using the new design robot motion and updated obstacle data from the sensors.

14. The method according to claim 13 wherein the at least one computing device is a robot controller which executes all of computing a design robot motion, computing a commanded robot motion, computing robot joint control commands, and providing the robot joint control commands to the robot.

15. The method according to claim 13 wherein a first computing device executes computing the design robot motion and computing the commanded robot motion, and a robot controller executes computing the robot joint control commands, and providing the robot joint control commands to the robot.

16. The method according to claim 13 wherein the commanded robot motion is computed using an iterative optimization computation having an objective function and a plurality of inequality constraints, where the objective function minimizes deviation from the design robot motion, and the inequality constraints include maintaining robot joint positions within predefined joint position ranges, maintaining robot joint velocities below predefined joint velocity limits and maintaining robot joint accelerations below predefined joint acceleration limits.

17. The method according to claim 16 wherein the inequality constraints also include a safety constraint computed from a safety function, where the safety function is determined based on a robot-obstacle minimum distance and a robot-obstacle relative velocity.

18. The method according to claim 17 wherein the safety constraint is that the rate of change of the safety function must be greater than or equal to the negative of the safety function multiplied by a coefficient.

19. The method according to claim 17 wherein, when the robot-obstacle relative velocity is greater than zero, the safety function is equal to the robot-obstacle minimum distance, and when the robot-obstacle relative velocity is less than or equal to zero, the safety function is equal to the robot-obstacle minimum distance minus the relative velocity squared divided by two times a maximum robot acceleration.

20. The method according to claim 13 wherein the design robot motion is a tool center point acceleration in Cartesian space, and the commanded robot motion includes robot joint rotational accelerations for all joints in the robot.

* * * * *